Figure 4:
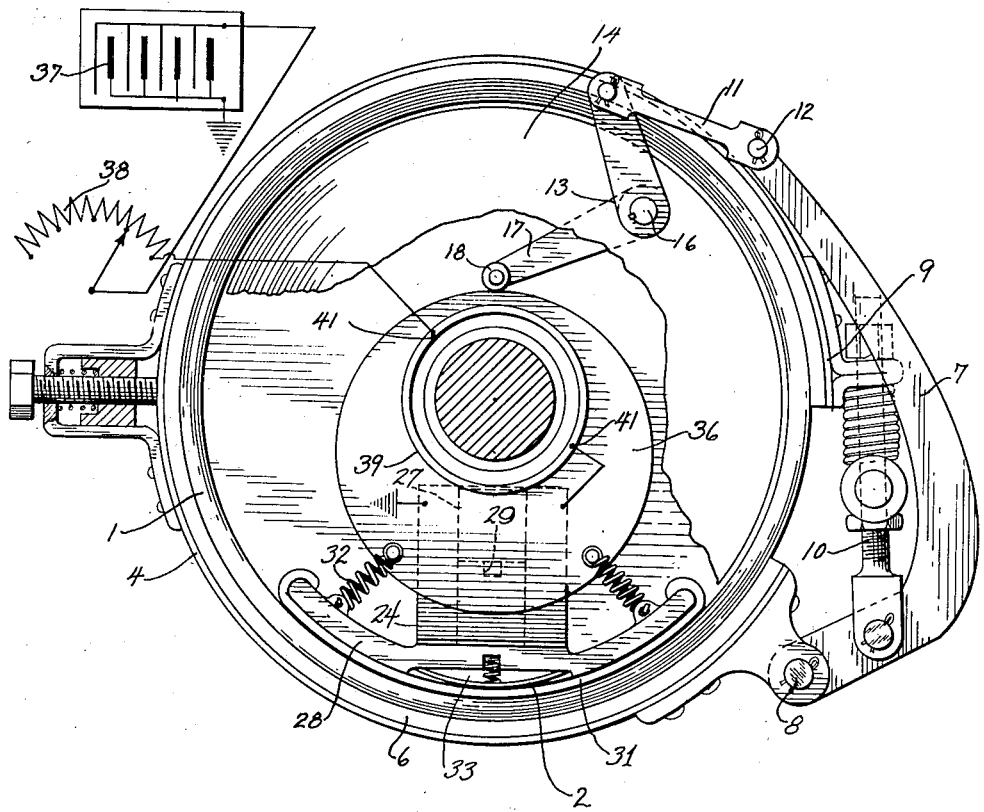

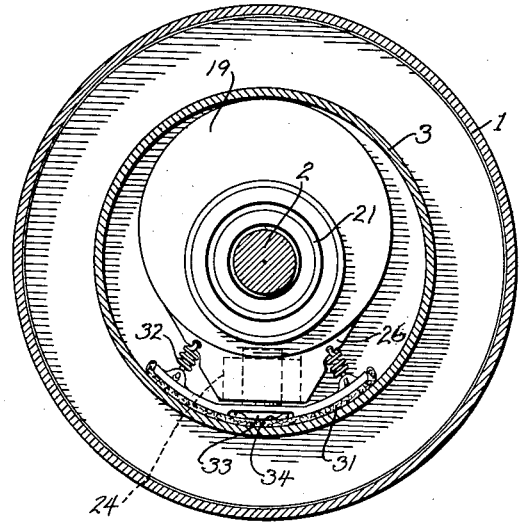
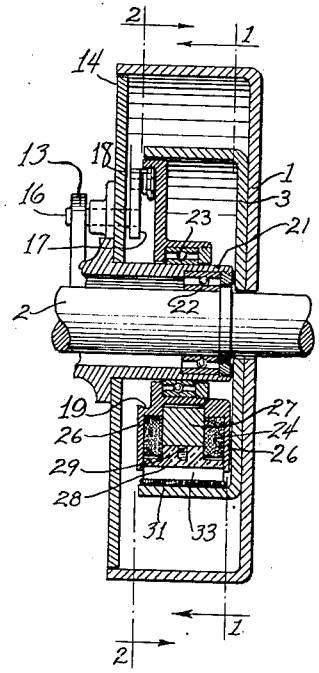
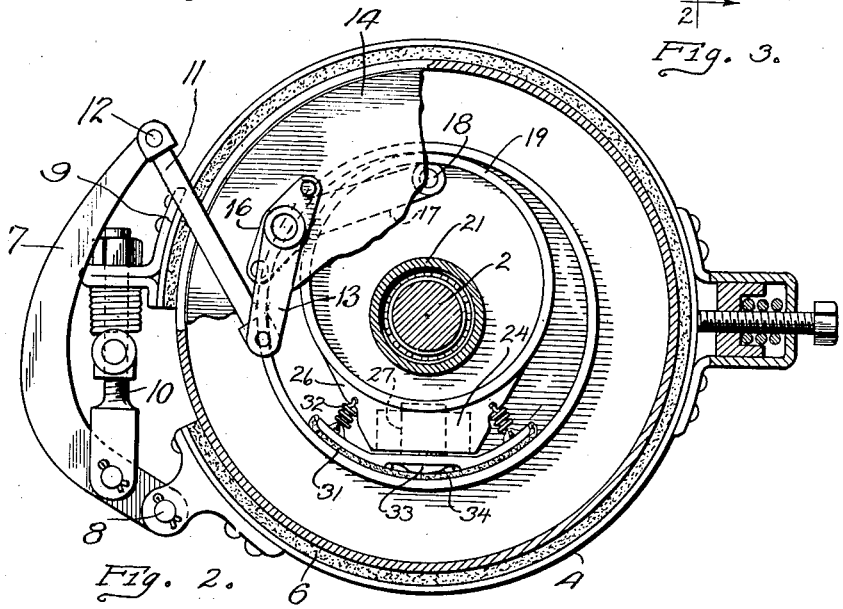

Patented June 23, 1931

1,811,260

UNITED STATES PATENT OFFICE

DAVID R. CUSHMAN, OF ALBANY, CALIFORNIA

ELECTRIC BRAKE

Application filed December 8, 1926. Serial No. 153,291.

The present invention relates to improvements in brakes for motor vehicles, and its particular object is to provide an electrically operated brake, allowing the driver of a motor vehicle to apply the brake by the mere closing of a switch in an electrical circuit. More particularly, it is proposed to provide, in combination with the conventional brake mechanism of a motor vehicle, electrically operated means for rendering the same active. It is intended for this purpose to use a cam which is normally inactive, but which may be rendered active for operating the brake mechanism by means of an electro-magnet or, more particularly, a solenoid connecting the cam to a revolving element of the motor vehicle such as the brake drum. Further objects and advantages of my invention will appear as the specification proceeds.

The preferred form of my invention is illustrated in the accompanying drawings in which—

Figure 1 shows a vertical transverse section thru a brake mechanism, having my invention embodied therein as viewed from line 1—1 of Figure 3, Figure 2 an inside view of the brake mechanism with certain portions broken away as viewed from line 2 of Figure 3, Figure 3 a longitudinal section thru the brake mechanism and, Figure 4 an inside view of a modified form of brake mechanism, a stationary plate being partly broken away to disclose the interior.

While I have shown only the preferred form of the invention, I wish to have it understood that various changes or modifications may be made within the scope of the claims hereto attached without departing from the spirit of the invention.

As illustrated in Figures 1 to 3, my brake mechanism comprises the brake drum 1 fixed relative to a wheel of a motor vehicle, not shown in the drawings, which latter wheel receives rotary motion from the axle 2. A second smaller drum 3 mounted concentrically with the first drum is fixed relative thereto.

The brake mechanism may be of any suitable form and may include a brake band 4 with a brake lining 6 surrounding the drum and adapted to be tightened upon the latter by means of a lever 7 pivoted to one end of the brake band as shown at 8 and adapted to draw the other end 9 toward the first end by means of a link 10 of any conventional construction when the lever is actuated in the proper direction. A link 11 is pivoted to the free end of the lever 7 as at 12 and is actuated by means of a bell crank lever 13 pivoted in the axle housing plate 14 as shown at 16. The free arm 17 of this bell crank lever is provided with a roller 18 adapted to ride along the inner face of a cam 19 eccentrically mounted with freedom of rotary motion on the axle housing 21 within the confines of the inner drum 3. Suitable bearings 22 and 23 may be interposed between the axle 2 and the axle housing 21 and between the latter and the eccentric respectively.

The eccentric has a solenoid 24 fixed relative thereto so as to extend in radial direction from that portion of the periphery closest to the axis of rotation. The electro-magnet is supported in a frame 26 which may be formed integral with the eccentric. The plunger 27 of the solenoid has a shoe 28 threaded thereon as at 29, the shoe corresponding in form to the smaller drum 3 and extending normally to within close proximity thereof, but so as to clear the same. The shoe is made of nonconductive material and is provided, on its outer face, with proper lining 31. Normally, the shoe is held out of contact with the inner brake drum by means of springs 32, but when the electro-magnet is energized, the plunger 27 forces the shoe outwardly and into intimate contact with the drum 3 whereby the eccentric cam is made to revolve with the drum. This revolving motion of the cam causes the lever 17 to be actuated for operating and tightening the brake band.

It will be noted that in a central portion of the shoe 28 there is provided a recess 33 in which a spring 34 tends to force a central portion of the lining 31 of the shoe outwardly so that this central portion engages with the drum in advance of the remainder of the brake shoe lining.

The form shown in Figure 4 does not essentially differ from that shown in Figures 1 to 3, the principal difference being that the inner drum 3 is omitted and that the shoe 28 operates on the brake drum 1 directly. Instead of the internal cam of Figure 2, an external cam 36 is provided which allows the roller 18 to ride thereon. A simple wiring diagram is shown in connection with this modified form, including the battery 37, a rheostat 38, a ring 39 fixed relative to the cam 36, and brushes 41 establishing contact with the ring. The circuit may be easily traced from the drawings.

It will be understood that when the circuit of the electro-magnet is closed, the plunger forces the shoe 28 outwardly so that its lining is brought into intimate contact with the revolving brake drum which causes the eccentric to revolve with the latter. The eccentric cam operates the lever 13 and thereby sets the brake.

I claim:

1. In combination, a revolvable element, a cam element mounted coaxially therewith, a radial plunger reciprocating in said cam and having a shoe thereon adapted for engagement with the revolvable element for imparting rotary motion to the cam, a brake mechanism operated by the cam and electro-magnetic means operating the plunger for rendering the cam active.

2. In combination, a revolvable brake drum having an axle housing thereon, a brake band adapted to be tightened thereon, means for tightening the brake band including a pivoted lever, a cam within the brake drum and rotatable on the axle housing of the brake drum, friction means radially slidable in said cam allowing the cam to be connected to the brake drum for imparting the motion of the former to the latter, electro-magnetic means for radially moving the friction means, the cam being mounted relative to the lever for actuating the same whereby the brake band is tightened upon the brake drum.

3. In combination, a revolvable shaft, a drum revolvable therewith, a cam loose on the shaft, an element mounted in said cam with freedom of radial motion and adapted to coact with the drum for imparting the motion thereof to the cam and electro-magnetic means in said cam for radially moving the said element into engagement with the drum.

4. In combination, a revolvable brake drum having an axle housing thereon, a brake band adapted to be tightened thereon, means for tightening the brake band including a pivoted lever; a cam rotatable on said axle housing within the drum; a plunger radially slidable in said cam; a friction shoe thereon for connecting the same to the inside periphery of the drum, electro-responsive means fixedly secured into said cam and adapted to radially move said plunger; the cam being mounted relative to the lever for actuating the same, whereby the brake band is tightened upon the brake drum.

5. In combination, a revolvable shaft, a drum revolvable therewith; a cam loose on the shaft, a plunger mounted in said cam with freedom of radial motion; a friction shoe on the plunger coacting with the drum for imparting the motion thereof to the cam; and electro-responsive means fixedly secured into said cam for radially moving said plunger into engagement with the drum.

6. In combination, a revolvable shaft, a drum revolvable therewith; a cam loose on the shaft, a plunger mounted in said cam with freedom of radial motion; a resiliently mounted friction shoe on the cam coacting with the drum for imparting the motion thereof to the cam; and electro-responsive means fixedly secured into said cam for radially moving said plunger into engagement with the drum.

7. In combination, a revolvable brake drum having an axle housing thereon; a brake band adapted to be tightened on the drum, means for tightening the brake band including a pivoted lever; a cam rotatable on the axle housing within the said drum; a lug extending from said cam; a plunger radially slidable in said lug, a friction shoe mounted on said plunger and being resiliently secured to said lug; and electro-responsive means fixedly secured into said cam for radially moving said plunger into engagement with the drum; the cam being mounted relative to the lever for actuating the same, whereby the brake band is tightened upon the brake drum.

8. A mechanism for operating the brake of an automobile wheel having an axle sleeve affixed thereto, a brake drum affixed to the wheel, a brake band surrounding the drum, a drum concentric with the first named drum and affixed to the wheel, a cam rotatable upon the housing, an actuating lever affixed at one of its ends to one end of the brake band, a bell crank pivotally related to the wheel intermediate the drums and contacting with the cam at one of its ends and a link interposed between the free end of the brake band and the actuating lever and pivotally related thereto, one end of the brake band being secured to the link.

9. A mechanism for operating the brake of an automobile wheel having an axle sleeve affixed thereto, a brake drum affixed to the wheel, a brake band surrounding the drum, a drum concentric with the first named drum and affixed to the wheel, a cam rotatable upon the housing, an actuating lever affixed at one of its ends to one end of the brake band, a bell crank pivotally related to the wheel intermediate the drums and contacting with the cam at one of its ends, a link interposed between the free end of the brake band and the actuating lever and pivotally related thereto, one end of the brake band being secured to the link and means for securing the cam to the concentric housing in non-rotatable relation therewith.

10. A mechanism for operating the brake of an automobile wheel having an axle sleeve affixed thereto, a brake drum affixed to the wheel, a brake band surrounding the drum, a drum concentric with the first named drum and affixed to the wheel, a cam rotatable upon the housing, an actuating lever affixed at one of its ends to one end of the brake band, a bell crank pivotally related to the wheel intermediate the drums and a roller carried by the bell crank and contacting with the cam, a link interposed between the free end of the brake band and the actuating lever and pivotally related thereto, one end of the brake band being secured to the link and means for securing the cam to the concentric housing in non-rotatable relation therewith.

11. A mechanism for operating the brake of an automobile wheel having an axle sleeve affixed thereto, a brake drum affixed to the wheel, a brake band surrounding the drum, a drum concentric with the first named drum and affixed to the wheel, a cam rotatable upon the housing, an actuating lever affixed at one of its ends to one end of the brake band, a bell crank pivotally related to the wheel intermediate the drums and a roller carried by the bell crank and resting on the cam, a link interposed between the free end of the brake band and the actuating lever and pivotally related thereto, one end of the brake band being secured to the link, means for securing the cam to the concentric housing in non-rotatable relation therewith and a solenoid for urging the cam in contact with the concentric drum.

12. A mechanism for operating the brake of an automobile wheel having an axle sleeve affixed thereto, a brake drum affixed to the wheel, a brake band surrounding the drum, a drum concentric with the first named drum and affixed to the wheel, a cam rotatable upon the housing, an actuating lever affixed at one of its ends to one end of the brake band, a bell crank pivotally related to the wheel intermediate the drums and a roller carried by the said bell crank and contacting with the cam, a link interposed between the free end of the brake band and the actuating lever and pivotally related thereto, one end of the brake band being secured to the link, means for securing the cam to the concentric housing in non-rotatable relation therewith and a solenoid support between the cam having a plunger, a shoe carried by the plunger and adapted to be forced into contact with the concentric drum by the action of the plunger.

13. A mechanism for operating the brake of an automobile wheel having an axle sleeve affixed thereto, a brake drum affixed to the wheel, a brake band surrounding the drum, a drum concentric with the first named drum and affixed to the wheel, a cam rotatable upon the housing, an actuating lever affixed at one of its ends to one end of the brake band, a bell crank pivotally related to the wheel intermediate the drums and a roller carried by the bell crank and contacting with the cam, a link interposed between the free end of the brake band and the actuating lever and pivotally related thereto, one end of the brake band being secured to the link, means for securing the cam to the concentric housing in non-rotatable relation therewith, a solenoid supported by the wheel and having a plunger, a shoe carried by the plunger and adapted to be forced into contact with the concentric drum by the action of the plunger and springs for normally holding the shoe in spaced relation with the drum.

14. A mechanism for operating the brake of an automobile wheel comprising a brake drum secured to the wheel, an axle sleeve passing through and rotatable with the wheel, a cam rotatably related to the sleeve, a brake band surrounding the drum, an actuating lever pivotally related to one end of the brake band, a bell crank pivotally related to the wheel intermediate the axle sleeve and the drum, a contact roller carried by the free end of the bell crank lever and in contact with the cam and a link pivotally related between the other end of the bell crank and the actuating lever, the free end of the brake band being secured to the link.

In testimony whereof I affix my signature.

DAVID R. CUSHMAN.